United States Patent
Lazri et al.

(10) Patent No.: US 9,817,970 B2
(45) Date of Patent: Nov. 14, 2017

(54) METHOD FOR DETECTING ATTACKS ON VIRTUAL MACHINES

(71) Applicant: ORANGE, Paris (FR)

(72) Inventors: Kahina Lazri, Caen (FR); Sylvie Laniepce, Caen (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/770,437

(22) PCT Filed: Mar. 3, 2014

(86) PCT No.: PCT/FR2014/050458
§ 371 (c)(1),
(2) Date: Aug. 25, 2015

(87) PCT Pub. No.: WO2014/132009
PCT Pub. Date: Sep. 4, 2014

(65) Prior Publication Data
US 2016/0004863 A1     Jan. 7, 2016

(30) Foreign Application Priority Data
Mar. 1, 2013  (FR) ...................................... 13 51866

(51) Int. Cl.
*G06F 9/45*      (2006.01)
*G06F 21/55*    (2013.01)
(Continued)

(52) U.S. Cl.
CPC ........ *G06F 21/554* (2013.01); *G06F 9/45558* (2013.01); *H04L 63/1416* (2013.01);
(Continued)

(58) Field of Classification Search
CPC combination set(s) only.
See application file for complete search history.

(56) References Cited

U.S. PATENT DOCUMENTS 8,615,579 B1 * 12/2013 Vincent ................. G06F 9/4856
709/223
9,009,677 B2 * 4/2015 Zhao .................... G06F 11/3688
717/127
(Continued)

OTHER PUBLICATIONS

The Written Opinion for application PCT/FR2014/050458.
(Continued)

*Primary Examiner* — Josnel Jeudy
(74) *Attorney, Agent, or Firm* — Haverstock & Owens LLP (57) ABSTRACT

The invention relates to a method for detecting attacks on at least one virtual machine in a system including at least one host server (10) hosting a set of virtual machines (VM1, VM2, VM3, etc.), the method including the steps of: receiving (E2) an alert indicating a breakdown in performance in a virtual machine; verifying (E3) that a mechanism for managing resource contention has been implemented for the virtual machine; detecting (E5), over a given time interval, at least one time correlation between the breakdown in performance that occurred in the virtual machine and a variation in the use of at least one resource of the host server by at least one other virtual machine, data representing the use of resources being collected at regular intervals.

12 Claims, 3 Drawing Sheets

(51) Int. Cl.
      *G06F 9/455*    (2006.01)
      *H04L 29/06*    (2006.01)
(52) U.S. Cl.
      CPC .............. *G06F 2009/45587* (2013.01); *G06F 2221/034* (2013.01)

(56) References Cited

U.S. PATENT DOCUMENTS

| | | | |
|---|---|---|---|
| 9,367,379 B1 * | 6/2016 | Burke | G06F 9/546 |
| 9,405,666 B2 * | 8/2016 | Kruglick | H04L 43/50 |
| 9,608,909 B1 * | 3/2017 | Bharadwaj | H04L 47/11 |
| 2009/0044265 A1 | 2/2009 | Ghosh et al. | |
| 2011/0258701 A1 * | 10/2011 | Cruz | G06F 21/554 726/23 |
| 2012/0096460 A1 * | 4/2012 | Sekiguchi | G06F 9/45558 718/1 |
| 2014/0223556 A1 * | 8/2014 | Bignon | H04L 63/1441 726/22 |

OTHER PUBLICATIONS

Sebastian Roschke et al., "Instrusion Detection in the Cloud", pp. 729-734, XP055011860, 2009 Eighth IEEE.

Fatemeh Azmandian et al., "Virtual Machine Monitor-Based Lightweight Intrusion Detection", vol. 45, No. 2, July 18, 2011, p. 38, XP055101403.

Amir Vahid Dastjerdi et al., "Distributed Intrusion Detection in Clouds Using Mobile Agents", Oct. 11, 2009, pp. 175-180, Third International conference ,XP031584634, ISBN:978-1-4244-5082-4.

\* cited by examiner

METHOD FOR DETECTING ATTACKS ON VIRTUAL MACHINES

The present invention concerns a method for detecting attacks in a virtualized computer environment, that is to say one that has been rendered virtual.

It can be implemented particularly advantageously when providing security for computer systems whose architecture is based on dematerialized computer resources placed at the disposal of a large number of users who access them remotely and in a manner that changes over time, that is to say on demand. Such an architecture is better known by the name "cloud computing" architecture.

The concept of cloud computing denotes computer architectures in which computer processing that is traditionally located on client stations of users in a company, or on servers in the company, is relocated to remote servers. Remote hardware resources, which are distributed worldwide, are thus accessed on demand via the Internet in order to create services that can be accessed online by users. The applications and the data are no longer located on the local computer of the user, or on the server located in the company of this user, but rather in a cloud that is made up of a certain number of interconnected remote servers.

A cloud computing architecture relies on dematerialization based on virtualization of physical resources. The virtualization involves executing a plurality of operating systems on a single computer, or host server, as if they were working on different computers. Virtual environments called virtual machines are thus provided for the users. Virtualization allows the performance of an infrastructure to be increased by providing maximum optimization for the use of the resources of the infrastructure. It furthermore generates a large saving by pooling resources and activities.

Cloud computing architectures are proposed for clients with service and availability guarantees that are negotiated by contract and in return for pricing suited to the resources that are allocated. In order to maximize the use of resource capacities and thereby to maximize the economic performance of cloud computing tenders, the resources are generally overstretched. Thus, the total quantity of resources configured for all of the virtual machines that are present on a host server is greater than that actually available on this host. This is because it is assumed that most of the time each of the virtual machines does not attempt to use all of the configured resources, or in any case not at the same moment as the other virtual machines that are jointly located on the same host server.

In order to provide clients with access at all times to resources in accordance with the terms of the contract that they have negotiated, resource contention management mechanisms are set up. These allow the use of the resources to be balanced in real time on a host server, or even on a set of host servers.

By way of example, when there is an increase in the load on a virtual machine hosted by a host server that, upon this increase in load, reaches its capacity limit, the priority of this virtual machine is evaluated in relation to other virtual machines jointly located on the same host server in order to allocate additional resources to it. Such allocation of additional resources can involve implementing memory sharing: identical pages used by a plurality of virtual machines are pooled. Memory space is thus recovered and placed at the disposal of virtual machines that need more resources. Such a mechanism is particularly advantageous when the same operating system or the same applications is/are installed on a plurality of virtual machines. An inflation mechanism for the memory can likewise be implemented: memory pages are thus recovered by an inflation pilot that is activated by a virtualization layer, by exerting a memory pressure on the operating system of a virtual machine. Thus, when the operating system of the virtual machine is under resource constraints owing to the pressure exerted by the pilot, the operating system activates its own algorithms for managing the memory and, in particular, if necessary, switches memory pages to its own disk space. This mechanism for switching memory pages is better known by the term virtual memory or memory swap or else swap memory. Allocation of additional resources can likewise involve moving the virtual machine in question to another host server that has sufficient resources, or moving machines located on the same host server as this virtual machine to another host server so that said virtual machine has more resources available, or else duplicating the virtual machine on a plurality of host servers so as to meet the increased resource needs.

However, these resource contention management mechanisms, which are implemented in order to meet an additional resource demand from a first virtual machine, can affect one or more other virtual machines. By way of example, when the mechanism for inflating the memory is implemented on a virtual machine, the latter can experience a deterioration in performance for accessing its memory. In the case of a virtual machine being migrated from a source host server to a destination host server, the migrated virtual machine can suffer a deterioration of performance that can vary according to the load on the source host server and/or on the destination host server, according to the load on the virtual machine and the nature of the applications that it executes. At the time of the migration, the virtual machine can, in the worst case, suffer an unacceptable isolated loss of connectivity (the term usually used to denote this loss of connectivity is "down time").

Thus, the implementation of resource contention management mechanisms on a virtual machine in order to meet the increased resource needs of another virtual machine can have a not insignificant impact on the virtual machine. This isolation flaw in a virtual machine in relation to events that have occurred on another virtual machine constitutes a new type of security vulnerability. This is because ill-intentioned persons can intentionally cause variations on first virtual machines, such as demands for additional resources with considerable and periodic fluctuations, in order to trigger resource contention management mechanisms that produce their effects on other virtual machines. This constitutes a new form of attack that is not detected as such for the time being. This is because the detection of attacks is generally concerned with a resource space that is directly manipulated by an attacker: the attacker manipulates and attacks the resources of this space and known attack detection methods are concerned only with this resource space. Thus, no attack is detected on machines jointly located on the host server that are not part of this space. With this new type of attack, the harmful effect is obtained as a side effect in a way. Current attack detection mechanisms are ill suited to detecting and analyzing this new type of attack.

One of the aims of the invention is to overcome inadequacies/disadvantages of the prior art and/or to make improvements thereto.

To this end, the invention proposes a method for detecting attacks on at least one virtual machine in a system comprising at least one host server hosting a set of virtual machines, the method comprising the steps of:

reception of an alert that is representative of a deterioration of performance on a virtual machine, checking that a resource contention management mechanism has been implemented for the virtual machine, detection, over a given time interval, of at least one temporal correlation between the deterioration of performance that has occurred on the virtual machine and a variation in use, by at least one other virtual machine, of at least one resource of the host server, data that are representative of the use of the resources being collected at regular intervals.

The method according to the invention is concerned with a new type of vulnerability that is linked to the implementation of resource contention management mechanisms in a cloud computing environment; it proposes a method for detecting attacks that is linked to this type of vulnerability. This is because it can be seen that such a resource contention management mechanism, when implemented, can cause a deterioration of performance on one or more virtual machines. Thus, an ill-intentioned person prompting the implementation of such mechanisms by influencing certain virtual machines in a controlled manner can cause a harmful effect, likened to an attack, on one or more virtual machines that are jointly located on the same host server. To do this, the ill-intentioned person can take control of virtual machines or manipulate his own virtual machines. The attack can be described as global because it aims to harm the architecture as a whole, without targeting a particular virtual machine.

The method of the invention takes account of an execution context for the virtual machine in its environment. On detection of a deterioration of performance on the virtual machine, there is a check to determine whether the hypervisor has implemented on the host server a resource contention management mechanism that has affected the virtual machine. If this is the case, information that is representative of the use of the resources of the host server by the virtual machines in the environment is used to look for temporal correlations between the deterioration that has occurred on the virtual machine, and variations in resource use on other virtual machines. These temporal correlations are representative of a cause and an associated effect.

Thus, unlike known methods that attempt to detect an attack on target machines, or machines that are victims of the attack, the method of the invention attempts to identify attacks on the manipulated virtual machines, which are different than the target machines that undergo the damage from the attack. It is generally easier to detect an attack on the target machine and it is likewise easier to supervise and stop the attack on a target machine. In the case of the new vulnerabilities targeted by the method of the invention, the attack attempts to harm the architecture as a whole, and no virtual machine in particular is targeted. The usual methods of detection are therefore more difficult to apply.

Moreover, the method of the invention can be described as lightweight in terms of impact on the architecture. This is because temporal correlations are detected only after a deterioration of performance has been observed on a virtual machine and after the assurance has been provided that a resource contention management mechanism has been activated for the virtual machine. Thus, the steps of the method are implemented only after a series of events has been observed. The method is therefore not continuously active and does not happen to disturb the activities of the architecture in terms of performance. Furthermore, the detection of attacks is implemented locally, on a host server. The quantity of data to be analyzed therefore remains on the scale of the host server and is therefore independent of the number of host servers that make up the architecture.

The method of the invention is triggered by reception of a short alert. The security management entity in charge of the step of detecting temporal correlations compares the data of the alert with data that are usually available on the host server, within the context of supervision activities on the host server. Thus, the security management machine has all the information available that is necessary to achieve detection of temporal correlations. The method of the invention therefore does not lead to any transmission of additional data and therefore does not affect the performance of the architecture in terms of bandwith.

Advantageously, the method furthermore comprises a step of analysis of the use of the resources of the host server by said other virtual machine over the given time interval, said analysis being intended to confirm that the other virtual machine is at the origin of the deterioration of performance on the virtual machine.

The method of the invention moreover comprises an analysis step that allows detailed analysis of the hostile behavior of virtual machines. Such analysis allows the drawing-up of a hostile behavior profile that involves one or more virtual machines. Thus, it is possible to identify a recurrent behavior, which goes beyond the scope of the analysis performed over the given time interval, and to better understand the attack. According to another example, it is possible to identify that a plurality of machines are cooperating in order to perpetrate an attack.

Such analysis allows an attack to be analyzed globally on the basis of isolated data, which are obtained over a given time interval.

In one embodiment, the resource contention management mechanism belongs to the group comprising: memory inflation for the virtual machine by a pilot that is activated on the virtual machine by a hypervisor of the host server, compression of memory pages of the virtual machine, movement of at least one memory page of the virtual machine to memory areas of the hypervisor, migration of the virtual machine to a second host server.

A common feature of the mechanisms identified in this assembly is that they are likely to cause deterioration of the performance of a virtual machine.

Advantageously, when the alert results from the migration of the virtual machine on a second host server, the method furthermore comprises the steps of:

reception of the alert transmitted by the migrated virtual machine by a second, security virtual machine, which is included on the second host server, sending, by the second, security virtual machine, of said alert to the security virtual machine of the host server from which the virtual machine has migrated.

The method of the invention, described mainly in its application to an architecture that comprises a single host server, can likewise be applied in a cluster-type architecture which comprises a plurality of host servers. In this more complex architecture, the method of the invention does not require any centralization of the detection activity since this activity remains implemented on the host server that accommodates the virtual machine on which the deterioration of performance constituting the harmful effect of the attack is perceived. This is because if the deterioration results from the migration of the virtual machine from a source host server to a destination host server, the alert transmitted by the virtual machine is retransmitted to the security management entity of the source host server in order to study this alert in its original environment.

The invention also concerns the use of the method according to the invention in order to detect an incompatibility between a consumption profile for the resources of the first virtual machine and a consumption profile for the resources of a second virtual machine that is hosted by the host server.

The invention can be used advantageously for placing virtual machines in a cloud computing architecture by detecting an incompatibility between consumption profiles for the resources of various virtual machines. Detection of this incompatibility allows a provider of the architecture to optimize the placement of the virtual machines and thus to avoid drops in performance.

The invention likewise relates to a security management entity residing in a virtual layer on a host server, the security management entity comprising:
- reception means, which are designed to receive from a virtual machine of the virtual layer an alert that is representative of a deterioration of performance in said machine,
- checking means, which are designed to verify that a resource contention management mechanism has been implemented for the virtual machine,
- detection means, which are designed to detect, over a given time interval, at least one temporal correlation between the deterioration of performance that has occurred on the virtual machine and a variation in use, by at least one other virtual machine of the virtual layer, of at least one resource of the host server, data that are representative of the use of the resources being collected at regular intervals.

The invention also concerns a system for detecting attacks comprising:
- a host server accommodating a set of virtual machines, and
- a security management entity as claimed in the invention.

The invention likewise concerns a computer program on a data storage medium and able to be loaded into the memory of a computer, the program comprising code portions for executing the steps of the method for detecting attacks as claimed in the invention when the program is executed on said computer.

The invention also relates to a data storage medium in which the program as claimed in the invention is recorded.

Other features and advantages of the present invention will be better understood from the description and the appended drawings, among which.

An architecture model that is suited to implementing a method for detecting attacks, according to a first exemplary embodiment, will now be described with reference to FIG. 1.

In a known manner, a cloud computing architecture conforms to a model that comprises a plurality of execution layers. Various models exist. The architecture described with reference to FIG. 1 presents an example of an architecture model for a host server 10. The host server 10 thus comprises a first execution layer, or hardware execution layer 10-1. This hardware execution layer 10-1 comprises a set of hardware resources r1, r2, r3, r4, etc. of the host server 10. By way of example, a hardware resource corresponds to memory, to a network interface, to a microprocessor, etc. A second execution layer is a virtualization layer 10-2. The virtualization layer 10-2 is suited to presenting operating systems of virtual machines VM1, VM2, VM3, VMsec, etc., of a virtual layer 10-4 with a virtual resource space, constructed from a physical resource space of the host server 10, in this instance the resource space r1, r2, r3, r4, etc. of the hardware execution layer 10-1. The virtualization layer 10-2 is implemented by a hypervisor that manages the allocation of physical resources between various instances of virtual machines. In the remainder of the description, the virtualization layer will be referred to by the term "hypervisor". A third execution layer is a management layer 10-3 for the architecture. The management layer 10-3 is suited to creating, instantiating, freeing and placing virtual machines VM1, VM2, VM3, VMsec, etc. executed concurrently on one and the same physical machine, in this case the host server 10. The management layer 10-3 is an interface between the hypervisor 10-2 and other entities such as the virtual layer 10-4, architecture supervision tools (not shown in FIG. 1), etc. Finally, a fourth execution layer is the virtual layer 10-4. The resources associated with this layer are the virtual machines VM1, VM2, VM3, VMsec, etc. that are executed in the virtual environment provided by the host server 10 as a physical machine. By way of example, virtual machines are user virtual machines that can comprise sensitive data or code needing to be protected. They may likewise be virtual security machines, dedicated to security and intended to protect the user virtual machines. The host server 10, conforming to the architecture model described previously, thus hosts user virtual machines VM1, VM2, VM3, etc., and a security management entity VMsec. Each virtual machine VM1, VM2, VM3, etc., comprises a module for supervising application performance ms1, ms2, ms3, etc. The supervising module ms1, ms2, ms3, etc. is a software module that is executed on the virtual machine VM1, VM2, VM3, etc., and that is suited to supervising the performance of applications that are executed on the virtual machine VM1, VM2, VM3, etc. In particular, the module for supervising performance ms1, ms2, ms3, etc., is suited to transmitting an alert for the attention of the security management entity VMsec in the event of a deterioration of performance in one of the applications that are executed on the virtual machine VM1, VM2, VM3, etc. being observed. The deterioration of performance can be felt in various ways: an increase in response time from an application, a decrease in the network bandwith, a decrease in the number of instructions executed per second, etc. By way of example, it is measured in relation to a level of resource availability that is negotiated by contract between a client and a cloud solution provider (the client and the provider are not shown in FIG. 1) that provides the client with the virtual environment accommodated by the host server 10. According to the invention, a deterioration of performance that is perceived on a virtual machine constitutes damage generated by the attack and undergone by the virtual machine. It is the perceptible effect of the attack on the virtual machine. The module for supervising performance ms1, ms2, ms3, etc. is configured to send an alert to the local security management entity VMsec at the end of a given period of deterioration of resource availability. By way of example, such deterioration of resource availability is observed when a speed changes from 100 Megabytes to 95 Megabytes, for a negotiated speed of 100 Megabytes. The security management entity VMsec, hosted by the host server 10, is designed to manage security on the host server 10. The security management entity VMsec is a privileged virtual machine capable of interacting with the hypervisor 10-2 via the management layer 10-3. It is an intermediary between the applications that are executed on the virtual machines VM1, VM2, VM3, etc., and the hypervisor 10-2. The hypervisor 10-2 is unable to perceive a deterioration of performance in an application that is executed on a virtual machine. This is because the hypervisor 10-2 sees not virtual machines VM1, VM2, VM3, etc., but only the virtual resources that it makes available to them. Moreover, the security management entity VMsec is suited to accessing an information base 12 that comprises a set of data that are representative of the use of the resources r1, r2, r3, r4, etc. by all of the virtual machines VM1, VM2, VM3, VMsec, etc. that are hosted by the host server 10. The information base 12 moreover comprises, for all of the virtual machines, information relating to resource contention management mechanisms that can be implemented on the host server 10. Thus, for each machine, it identifies what mechanism has been activated, on what date, etc. The information base 12 therefore comprises, for each virtual machine of the architecture, all relevant information relating to the use of resources, the implementation of specific mechanisms, etc. The data of the information base 12 are collected at regular intervals. Collection of the data at the base 12 is implemented by the hypervisor 10-2, more precisely by a collection module 10-21 of the hypervisor 10-2. The collection module 10-21 is configurable. In particular, the time interval between two collections relating to a resource is configurable. Thus, collections can be made more or less often, according to time intervals ranging from a few seconds to a few minutes, according to the resource in question and the criticality thereof. Equally, storage of the collected data is configurable and can extend over a fairly long period of time, which can extend over several months, according to the needs in terms of traceability of the architecture. Such a collection mechanism is known and is not explained in more detail here.

The architecture described with reference to FIG. 1 comprises a single host server 10. The invention is not limited to this type of architecture. Thus, in another exemplary embodiment (not represented), the architecture comprises a set of the resources that are organized in a cluster. The cluster groups together a set of host servers. Each host server is suited to hosting one or more virtual machines, according to the previously described architecture.

The steps of a method for detecting attacks, according to a first exemplary embodiment, will now be described with reference to FIG. 2.

The method is carried out in an environment conforming to the architecture described with reference to FIG. 1. In a prior phase (not shown in FIG. 2), virtual machines VM1, VM2, VM3, etc. as well as a security management entity VMsec have been created and instantiated. Each virtual machine VM1, VM2, VM3, etc. implements its own mechanism for supervising performance by means of a respective module for supervising performance ms1, ms2, ms3, etc. In a collection step E0, data that are representative of the use of the resources of the host server 10 by all of the virtual machines VM1, VM2, VM3, etc., and VMsec and resource contention management mechanisms are collected in the information base 12 by the collection module 10-21 of the hypervisor 10-2. This collection step E0 is a recurring task that is implemented at regular intervals in the architecture according to a configuration of the collection module 10-21. Thus, data such as the time for which the processor is used, the number of memory pages used, the use of network interfaces, the disk consumption, etc. are collected for each of the virtual machines of the host 10 and recorded in the information base 12 according to a virtual machine identifier. Thus, the information base 12 describes in detail, for each of the virtual machines VM1, VM2, VM3, etc., the level of use of each of the resources r1, r2, r3, r4, etc. provided for the virtual machines by the host server 10. Equally, information relating to the implementation of a resource contention management mechanism on a virtual machine is collected.

In a subsequent alert step E1, the module for supervising performance ms1 of the virtual machine VM1 detects a deterioration of performance in the virtual machine VM1. This deterioration corresponds to a deterioration of resource availability. By way of example, it translates into an increase in the response time from an application that is executed on the virtual machine VM1, a decrease in the network bandwith used by an application, a decrease in the number of instructions executed per second, etc. The module for supervising performance ms1 is configured so as to transmit an alert when the deterioration of performance is no longer acceptable. A deterioration of performance is no longer acceptable from the moment the terms of the contract signed between the client that operates the virtual machine VM1 and the provider of the architecture that provides the virtual machine VM1 for the client stipulate a determined percentage level of resource availability and this level is not observed over a given period. According to the invention, this deterioration of performance that is undergone by an application of the virtual machine VM1 potentially corresponds to a harmful effect that is undergone by the virtual machine VM1, and that is caused by an attack on another virtual machine. At this stage, the module for supervising performance ms1 cannot identify the resource(s) at the origin of the deterioration of performance. At the end of a determined period, it transmits an alert ALERT for the attention of the security management entity VMsec. The alert ALERT can be sent more or less rapidly, depending on the criticality of the application, depending on the magnitude of the deterioration of performance, and the frequency of observation. By way of example, a highly critical application can transmit an alert as soon as the deterioration of performance is observed, and a less critical application at the end of ten minutes or so, depending on the terms of the contract. The alert ALERT comprises information such as the time that has elapsed between detection of the deterioration of performance and the sending of the alert, the type of deterioration observed, such as high latency, a lower speed or a lower number of instructions executed per second, etc. The time elapsed is indicative of an initial instant at which a problem is observed on the virtual machine VM1.

The alert ALERT is received by the local security management entity VMsec in the course of a reception step E2.

In a checking step E3, the local security management entity VMsec verifies whether the alert ALERT received from the module for supervising the performance ms1 of the virtual machine VM1 is caused by a resource sharing problem between the various virtual machines hosted by the host server 10. To do this, the security management entity VMsec verifies that a mechanism for managing resource contention on the host server 10 has been activated on the virtual machine VM1 in the time interval during which the supervising mechanism ms1 has observed the deterioration of performance, and has affected the virtual machine VM1. This time interval has been provided as a parameter of alert ALERT. To this end, the security management machine VMsec accesses the information base 12. The activation of a resource contention management mechanism on a virtual machine features among the information collected in the information base 12. In another exemplary embodiment, the security management entity VMsec interrogates the management layer 10-3 in order to obtain this information. In this exemplary embodiment, it is then the management layer 10-3 that accesses the information base 12 before responding to the security management entity VMsec. The information base 12 is suited to storing, for each of the virtual machines of the architecture, information relating to the activation of the resource contention management mechanisms: the mechanism activated, the date on which it has been activated, the virtual machine(s) that has (have) been affected, etc.

Among the resource contention management mechanisms that are likely to have affected the performance of the virtual machine VM1, the following may be cited:

inflation of the memory of the virtual machine VM1 by an inflation pilot activated by the hypervisor 10-2. Memory pages of the virtual machine VM1 are thus recovered by the inflation pilot activated by the hypervisor 11 by exerting memory pressure on the operating system of the virtual machine VM1. Thus, when the operating system of the virtual machine VM1 is under resource constraints owing to the pressure served by the pilot, the operating system of the virtual machine VM1 activates its own memory management algorithms and, in particular, if necessary, switches memory pages to its own virtual disk. This memory management mechanism is better known by the term virtual memory, or "memory swap", or "swap memory". The effect of such a mechanism on the virtual machine VM1 is deterioration of the access time for the data stored in memory.

A memory swap on the hypervisor 10-2. In this case, memory pages of the virtual machine VM1 are moved to memory areas of the hypervisor 10-2. This mechanism can lead to a situation that corresponds to a double memory swap: memory swap on the virtual machine VM1, following a memory swap of the hypervisor 10-2 on the virtual machine VM1. This phenomenon is better known by the name "double paging". The effect of such a memory swap for the virtual machine VM1 is a deterioration of the access time for the data stored in memory.

Figure 2:
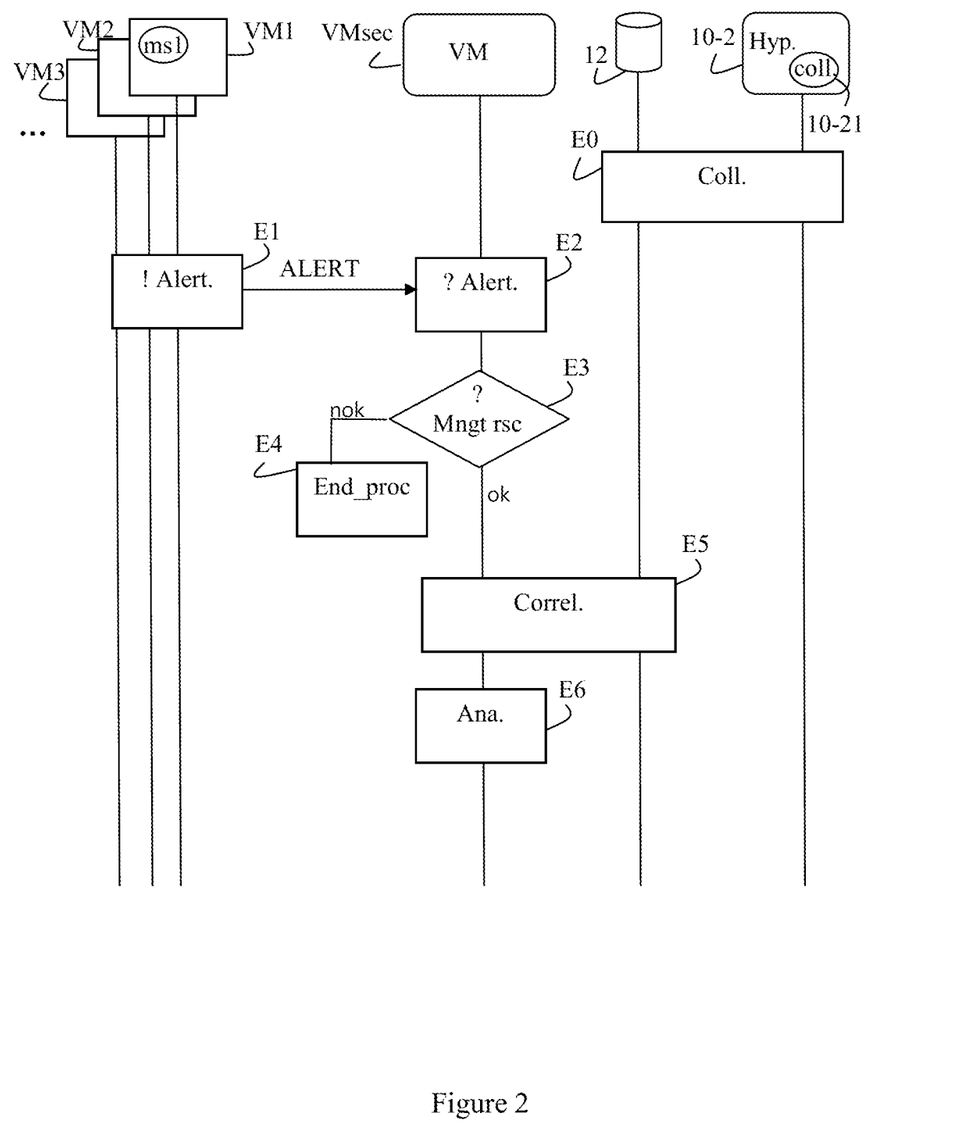
FIG. 2 shows the steps of a method for detecting attacks in a cloud computing environment, according to an exemplary embodiment of the invention.

Migration of the virtual machine VM1 to another host server (not shown in FIG. 2). The aim of such migration is to free resources that have been initially allocated by the host server 10 to the virtual machine VM1. The effect of the migration to the virtual machine VM1 may be an isolated loss of connectivity during a phase prior to the migration, in the course of which an execution context for the virtual machine VM1 is generated and stored (the term "down time" is usually used), as well as latency throughout the time for migration of the virtual machine VM1. A loss of connectivity, even very briefly, may be unacceptable for virtual machines that manage applications and data that are sensitive to latency, such as video applications, gaming applications, etc.

Compression of the memory that consists in compression of the memory pages before a memory swap is performed. The effect of such compression is deterioration of performance on the virtual machine VM1, which, in order to access these pages, first needs to decompress them.

Comparing the alert received from the module for supervising performance ms1 of the virtual machine VM1 with data collected on the host server 10 is advantageous because the virtual machine VM1 has no visibility with regard to mechanisms implemented by the hypervisor 10-2 at an overall level of the architecture, in this instance on the host server 10. Equally, the hypervisor 10-2 has no visibility with regard to a deterioration of performance on the applications of the virtual machine VM1, its view being limited to that of the virtual resources that said virtual machine presents thereto. The establishment of a cause-and-effect link between the activation of a resource contention management mechanism and deterioration of performance that is undergone by a virtual machine is therefore not immediate.

In a first case ("nok" branch in FIG. 1), in which no mechanism has been activated on the virtual machine VM1 at the origin of the alert, in an end of processing step E4 the security management entity VMsec ignores the alert received from the virtual machine VM1. Activation of a resource contention management mechanism on the virtual machine VM1 is understood to mean implementation of the mechanism by the hypervisor 10-2 that has affected the virtual machine VM1.

In a second case ("ok" branch in FIG. 2), corresponding to the case in which a mechanism for managing resource contention on the host server 10 has affected the virtual machine VM1, in a step E5 for detecting the temporal correlations the local security management entity VMsec looks for at least one temporal correlation between the deterioration of performance observed on the virtual machine VM1 and the use of resources of the host server 10 by the others virtual machines VM2, VM3, etc. that are jointly located with the virtual machine VM1 on the host server 10. The reason is that, in this case, the security management entity VMsec has the assurance that the deterioration of performance that is observed by the virtual machine VM1 that has produced the alert ALERT is due to the sharing of resources with other virtual machines that are accommodated by the host server 10. In order to implement this search for temporal correlations, the security management entity VMsec accesses the information base 12, which is fed regularly in accordance with the collection step E0, and compares the histories of resource consumption by the virtual machines that are jointly located with the virtual machine VM1 on the host server 10 with information that the alert ALERT contains. This comparison is performed over a time window that is determined by the security management entity VMsec. The time window may be a fixed time window. In another exemplary embodiment, the time window is dependent on the alert ALERT received in the course of step E2, and is dependent on the time interval that separates observation of the deterioration of performance from the sending of the alert ALERT, for example. The aim of this search for temporal correlations is to identify one or more consumption profiles associated with one or more virtual machines VM2, VM3, etc. that are jointly located with the virtual machine VM1 on the host 10 and that are at the origin of the triggering of the resource contention management mechanism that has caused the performance deterioration observed on the virtual machine VM1. The virtual machines associated with these identified consumption profiles are therefore at the origin of the transmission of the alert that is received in the course of alert step E1. They are therefore potentially at the origin of an attack on the architecture.

Thus, by way of example, this step E5 of detection of temporal correlations by observing the data that are representative of the use of resources involves observation of an increase in the use of the active memory on a given virtual machine, among the virtual machines that are jointly located with the virtual machine VM1, for example the virtual machine VM2, at the same time as activation, by the hypervisor 10-2, of an inflation pilot that is suited to recovering memory of the virtual machine VM1 by exerting pressure on the operating system of the virtual machine VM1. Thus, in this example, a greater demand for memory on the virtual machine VM2 that is jointly located with the virtual machine VM1 coincides with a memory swap that is implemented on the virtual machine VM1. The virtual machine VM2 is therefore potentially at the origin of an attack on the architecture.

In a subsequent analysis step E6, an analysis of the activity of the virtual machine VM2 for which a variation in the use of the resources of the host server has been identified as temporally correlated with the performance deterioration observed on the virtual machine VM1 is analyzed in detail in order to confirm an attack behavior. By way of example, a detailed analysis of the activity of the second virtual machine VM2 may show that the activity at the origin of an additional demand for resources is in fact caused by the execution of instructions that use the processor but do nothing. According to a second example, the detailed analysis of the activity of the second virtual machine VM2 shows that this same resource consumption scheme can be observed periodically. It is likely that this involves an attack through resource consumption with a hostile aim. The attack is perpetrated from the virtual machine VM2, either by a legitimate user of the virtual machine VM2 or by a third party that has illegally taken control thereof.

According to another exemplary embodiment, the detection of temporal correlations that is implemented in the course of step E5 identifies that a plurality of virtual machines that are jointly located with the virtual machine VM1 have a resource consumption profile at the origin of the activation of the resource contention management mechanism on the virtual machine VM1. The analysis implemented in the course of the subsequent analysis step E6 then shows that these virtual machines have a closely linked resource consumption scheme, and have together contributed to causing damage on the virtual machine VM1. In this example, there is collusion between a plurality of virtual machines in order to harm the architecture. It is likely that a third party has illegally taken control of the virtual machines involved with the aim of harming the architecture.

In another exemplary embodiment, in which the alert provided following an isolated loss of connectivity caused by migration of the virtual machine VM1 to a second host server (not shown), the alert is then received by a second security management entity (not shown) that is hosted by the second host server. In this case, the second local security management entity does not have any data collected on the host server 10 and therefore cannot successfully detect correlations between the alert that the virtual machine VM1 that has just been migrated has set up again and the activity of the virtual machines that are jointly located with the virtual machine VM1 on the host server 10. In this case, the method provides for the second security management entity to transmit to the security management entity VMsec of the host server 10 the data from the alert ALERT so that the detection of temporal correlation is implemented by the security management entity VMsec of the host server 10. This is because the second host server does not have any history of the resource consumption profiles of the virtual machines that are jointly located with the virtual machine VM1 at the time of the migration being triggered. In particular, it does not have the profile of the virtual machine that has caused migration of the virtual machine VM1.

In the example of cluster architecture described previously, the security management entity VMsec, in charge of the implementation of the detection method according to the invention, is located on the first host server. The invention is not limited to this type of architecture. Thus, in another exemplary embodiment, the security management entity is a centralized entity of the architecture that communicates with the virtual layers 10-4 of the various host servers and that notably receives the alerts transmitted by the modules for supervising the performance of all the virtual machines of the architecture. The centralized security management entity then implements an analysis at a global level of the architecture. A centralized management entity is advantageous when cascaded migrations are observed in the course of which the virtual machine VM1 is migrated from a first source host server to a first destination host server, and then rapidly migrated from this first destination host server to a second destination host server, etc. In this case, the centralized security entity that receives all of the alerts from the architecture is able to correlate and analyze these cascaded migrations.

The method of the invention concerns the detection of attacks in a cloud computing architecture. It can likewise be applied advantageously for optimizing the architecture, notably with the aim of optimized placement of virtual machines in the architecture. This is because the method of the invention is likewise suited to detecting that resource consumption profiles of different virtual machines are incompatible, that is to say that jointly locating these virtual machines on one and the same host server harms the architecture in terms of performance. By way of example, the method according to the invention can detect that a first virtual machine, whose consumption profile fluctuates, cannot cohabit well with a virtual machine that is very sensitive to latency. An example of a virtual machine whose consumption profile fluctuates is a web server that reaches peak resource consumption at certain times of the day, corresponding to a time slot in which the number of access operations is greater than the average. A virtual machine that is sensitive to latency corresponds to a video application, for example. Cohabitation of these two virtual machines can lead to a resource contention management mechanism being activated, which is detected by the method of the invention. Detection of temporal correlations and then the analysis that are implemented by the method of the invention then allow the recommendation that these two virtual machines not be placed on the same host server, at least during certain time slots.

Figure 3:
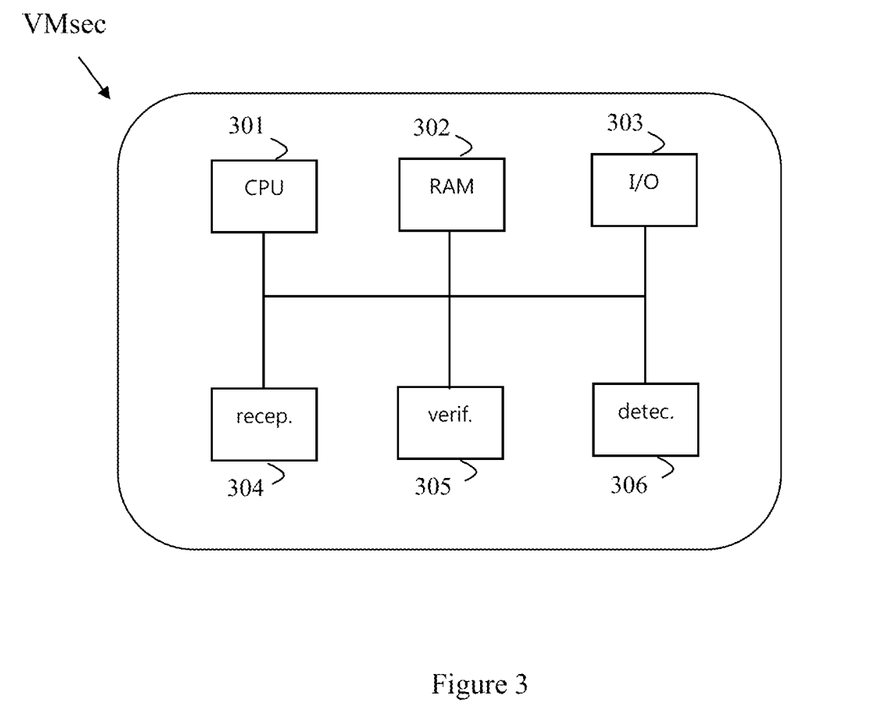
FIG. 3 is a functional block diagram of a security management entity that is suited to detecting attacks, according to an exemplary embodiment of the invention.

A security management entity, according to an exemplary embodiment of the invention, will now be described with reference to FIG. 3.

The local security management entity VMsec conforms to an architecture for computer equipment such as a terminal or a server. According to the architecture model described with reference to FIG. 1, the security management entity VMsec is a virtual machine that resides in the virtual layer of the host server 10 (the host server is not shown in FIG. 3). It conventionally comprises:

a microprocessor 301, or "CPU" (Central Processing Unit), that is intended to load instructions into memory, to execute said instructions and to perform operations,
 a set of memories, including a volatile memory 302, or "RAM" (for Random Access Memory) that is used to execute code instructions, to store variables, etc., communication interfaces 303, which are designed to communicate with other entities. In particular, the interfaces 303 are suited to communicating with the other virtual machines hosted by the host server 10 and with the hypervisor.

Figure 1:
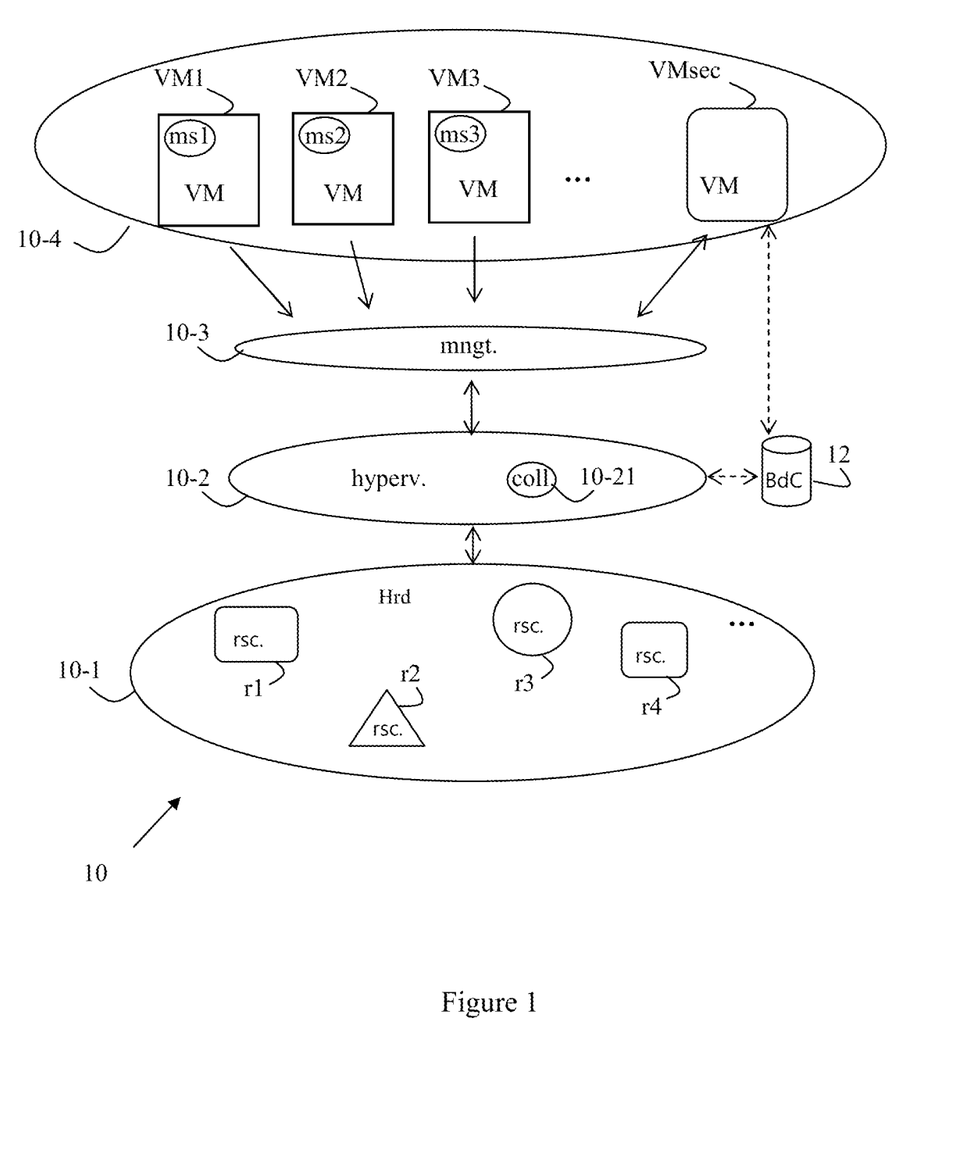
FIG. 1 is a schematic representation of a cloud computing architecture, according to an exemplary embodiment of the invention, in which the method of the invention is implemented.

It can be seen, in light of the description of the cloud computing model provided with reference to FIG. 1, that the resources that the security management entity VMsec has, such as the CPU, the memory, are virtualized resources of the host server 10 that are provided for the security management entity VMsec.

The security management entity VMsec likewise comprises:

reception means 304, which are designed to receive from a virtual machine on the virtual layer an alert that is representative of deterioration of the performance of said machine, verification means 305, which are designed to verify that a resource contention management mechanism has been implemented for the virtual machine. The verification means 304 cooperate with the communication interfaces 303 in order to obtain this information from the supervisor, detection means 306, which are designed to detect, over a given time interval, at least one temporal correlation between the deterioration of the performance that has occurred on the virtual machine and a variation in use, by at least one other virtual machine of the virtual layer, of at least one resource of the host server, data that are representative of the use of the resources being collected at regular intervals. The detection means 306 cooperate with the communication interfaces 303 in order to access the base for the data collected by the use of the resources by each of the virtual machines on the virtual layer.

The communication interfaces 303, the reception means 304, the verification means 305, the detection means 306 are preferably software modules comprising software instructions for executing the steps of the method for detecting attacks that has been described previously.

The invention therefore also concerns:

a computer program having instructions for implementing the method for detecting attacks as described previously when said program is executed by a processor of the security management entity VMsec, a readable recording medium on which the computer program described above is recorded.

The software modules may be stored in or transmitted by a data storage medium. This may be a hardware storage medium, for example a CD-ROM, a magnetic floppy disk or a hard disk, or else a transmission medium such as a signal or a telecommunication network.

The security management entity VMsec is described here as a virtual machine of the host server 10. In another exemplary embodiment, in which the architecture comprises a plurality of host servers, the security management entity may be a centralized entity.

The invention likewise relates to a system for detecting attacks that comprises a host server 10 that accommodates a set of virtual machines, and a security management entity VMsec as described previously.

The invention claimed is:

1. A method for detecting attacks on at least one virtual machine in a system comprising at least one host server hosting a set of virtual machines, the method comprising the steps of:

reception, by a security management entity hosted by a host server, of an alert that is representative of a deterioration of performance on a virtual machine, verification, by the security management entity, that a resource contention management mechanism has been implemented for the virtual machine, detection, by the security management entity, over a given time interval, of at least one temporal correlation between the deterioration of performance that has occurred on the virtual machine and a variation in use, by at least one other virtual machine, of at least one resource of the host server, data that are representative of the use of the resources being collected at regular intervals, said variation in use of the at least one resource of the host server being at the origin of the triggering of the resource contention management mechanism that has caused the performance deterioration observed on the virtual machine.

2. The method as claimed in claim 1, furthermore comprising a step of analysis of the use of the resources of the host server by said other virtual machine over the given time interval, said analysis being intended to confirm that the other virtual machine is at the origin of the deterioration of performance in the virtual machine.

3. The method as claimed in claim 1, in which the resource contention management mechanism belongs to the group comprising: memory inflation for the virtual machine by a pilot that is activated on the virtual machine by a hypervisor of the host server, compression of memory pages of the virtual machine, movement of at least one memory page of the virtual machine to memory areas of the hypervisor, migration of the virtual machine to a second host server.

4. The method as claimed in claim 1, in which, when the alert results from the migration of the virtual machine on a second host server, the method furthermore comprises the steps of:

reception of the alert transmitted by the migrated virtual machine by a second security virtual machine, which is included on the second host server, sending, by the second security virtual machine, of said alert to the security virtual machine of the host server from which the virtual machine has migrated.

5. The use of the method as claimed in claim 1, in order to detect an incompatibility between a consumption profile for the resources of the first virtual machine and a consumption profile for the resources of a second virtual that is machine hosted by the host server.

6. A security management entity residing in a virtual layer on a host server, the security management entity comprising:

a processing unit; and a non-transitory computer-readable memory, wherein the processing unit and the memory are adapted to:

receive from a virtual machine of the virtual layer of the host server an alert that is representative of a deterioration of performance in said machine, verify that a resource contention management mechanism has been implemented for the virtual machine, and detect, over a given time interval, at least one temporal correlation between the deterioration of performance that has occurred on the virtual machine and a variation in use, by at least one other virtual machine of the virtual layer, of at least one resource of the host server, data that are representative of the use of the resources being collected at regular intervals, said variation in use of the at least one resource of the host server being at the origin of the triggering of the resource contention management mechanism that has caused the performance deterioration observed on the virtual machine.

7. A system for detecting attacks comprising:
a host server accommodating a set of virtual machines, and
a security management entity residing in a virtual layer on a host server (10), the security management entity comprising:
   a processing unit; and
   a non-transitory computer-readable memory, wherein the processing unit and the memory are adapted to:
      receive from a virtual machine of the virtual layer an alert that is representative of a deterioration of performance in said machine,
      verify that a resource contention management mechanism has been implemented for the virtual machine,
      detect, over a given time interval, at least one temporal correlation between the deterioration of performance that has occurred on the virtual machine and a variation in use, by at least one other virtual machine of the virtual layer, of at least one resource of the host server, data that are representative of the use of the resources being collected at regular intervals, said variation in use of the at least one resource of the host server being at the origin of the triggering of the resource contention management mechanism that has caused the performance deterioration observed on the virtual machine.

8. A computer program stored on a non-transitory computer-readable data storage medium, the program comprising code portions for executing the steps of a method for detecting attacks on at least one virtual machine in a system comprising at least one host server hosting a set of virtual machines, the method comprising the steps of:
   reception, by a security management entity hosted by a host server, of an alert that is representative of a deterioration of performance on a virtual machine,
   verification, by the security management entity, that a resource contention management mechanism has been implemented for the virtual machine,
   detection, by the security management entity, over a given time interval, of at least one temporal correlation between the deterioration of performance that has occurred on the virtual machine and a variation in use, by at least one other virtual machine, of at least one resource of the host server, data that are representative of the use of the resources being collected at regular intervals, said variation in use of the at least one resource of the host server being at the origin of the triggering of the resource contention management mechanism that has caused the performance deterioration observed on the virtual machine.

9. A non-transitory computer-readable data storage medium in which a computer program is recorded, when the program is executed on the computer the program comprising code portions for executing the steps of a method for detecting attacks on at least one virtual machine in a system comprising at least one host server hosting a set of virtual machines, the method comprising the steps of:
   reception, by a security management entity hosted by a host server, of an alert that is representative of a deterioration of performance on a virtual machine,
   verification, by the security management entity that a resource contention management mechanism has been implemented for the virtual machine,
   detection, by the security management entity, over a given time interval, of at least one temporal correlation between the deterioration of performance that has occurred on the virtual machine and a variation in use, by at least one other virtual machine, of at least one resource of the host server, data that are representative of the use of the resources being collected at regular intervals, said variation in use of the at least one resource of the host server being at the origin of the triggering of the resource contention management mechanism that has caused the performance deterioration observed on the virtual machine.

10. The method as claimed in claim 2, in which the resource contention management mechanism belongs to the group comprising: memory inflation for the virtual machine by a pilot that is activated on the virtual machine by a hypervisor of the host server, compression of memory pages of the virtual machine, movement of at least one memory page of the virtual machine to memory areas of the hypervisor, migration of the virtual machine to a second host server.

11. The method as claimed in claim 2, in which, when the alert results from the migration of the virtual machine on a second host server, the method furthermore comprises the steps of:
   reception of the alert transmitted by the migrated virtual machine by a second security virtual machine, which is included on the second host server,
   sending, by the second security virtual machine, of said alert to the security virtual machine of the host server from which the virtual machine has migrated.

12. The method as claimed in claim 3, in which, when the alert results from the migration of the virtual machine on a second host server, the method furthermore comprises the steps of:
   reception of the alert transmitted by the migrated virtual machine by a second security virtual machine, which is included on the second host server,
   sending, by the second security virtual machine, of said alert to the security virtual machine of the host server from which the virtual machine has migrated.

* * * * *